United States Patent [19]
Mebus

[11] 4,170,288
[45] Oct. 9, 1979

[54] SIGNATURE HANDLING SYSTEM

[75] Inventor: Henry R. Mebus, Nazareth, Pa.

[73] Assignee: Harris Corporation, Cleveland, Ohio

[21] Appl. No.: 732,115

[22] Filed: Oct. 13, 1976

[51] Int. Cl.[2] .............................................. B65G 47/64

[52] U.S. Cl. .................................... 198/440; 198/605; 198/627

[58] Field of Search ............... 198/627, 628, 437, 440, 198/604, 605; 100/151, 153, 154

[56] References Cited

U.S. PATENT DOCUMENTS

| | | | |
|---|---|---|---|
| 1,824,413 | 9/1931 | Stein | 198/437 X |
| 3,469,673 | 9/1969 | Gentry | 198/440 X |
| 3,635,322 | 1/1972 | Raudat et al. | 198/440 |
| 3,676,265 | 7/1972 | Edwards | 100/151 |

FOREIGN PATENT DOCUMENTS

| | | | |
|---|---|---|---|
| 2402972 | 7/1975 | Fed. Rep. of Germany | 198/440 |

*Primary Examiner*—Robert B. Reeves
*Assistant Examiner*—Douglas D. Watts

[57] ABSTRACT

Apparatus for handling moving articles such as signatures or books. A conveyor means is moveable in timed relation to a series of the moving articles. The conveyor means carries a series of first and second guide means which are adapted to engage moving articles and which are moveable with the conveyor and relative to the conveyor. First and second cam means are engageable with the respective first and second guide means for positioning the guide means relative to the conveyor to establish a guide path for the articles which are engaged by the guide means. The guide paths are oriented so that the first and second guide means are disposed in a single stream over at least a portion of the path of travel of the conveyor. Article handling systems are disclosed which can perform such functions as (1) diverting a single stream of articles into a pair of streams, (2) combining a pair of streams of moving articles into a single stream, or (3) selectively diverting one or more articles out of a moving stream of articles.

3 Claims, 6 Drawing Figures

SIGNATURE HANDLING SYSTEM

BACKGROUND OF THE INVENTION

This application relates generally to an article handling system in which a series of articles such as books or signatures are fed in succession to form a stream. The principles of the invention are particularly applicable to form a system which performs such functions as (1) alternately feeding a stream of signatures into two streams, (2) combining two streams of signatures into a single stream, and (3) selectively rejecting either single signatures or a stream of signatures on command.

During mass production of articles such as books or signatures the handling of such articles is conventionally done at high speeds. In one typical book handling operation a stream of books being fed by a main conveyor are alternately diverted into a pair of stream of books. In another typical type of operation two streams of books are combined into a single stream and fed along the main conveyor. In yet another typical operation, a book, or a stream of books, are selectively diverted, on command, out of the stream of books being fed by the main conveyor.

In high speed book handling operations, and particularly those operations which selectively divert books, on command, out of a single stream of books it has heretofore been conventional to provide a switching or divert device which operates within the space between the trailing edge of one book and the leading edge of the following book. As handling speeds increase, this places extremely high demands on the speed at which the divert mechanism must be capable of diverting one book without interferring with the feeding of the next succeeding book.

In systems for handling articles other than books, other types of apparatus has been suggested for performing such functions as diverting a stream of articles into plural streams. For example, in the system of U.S. Pat. No. 3,635,322, it has been suggested to handle a stream of non-circular articles by alternately gripping every third article by grippers associated with one of a pair of conveyors and then stripping the articles from the grippers with the articles being diverted into three separate streams. This system while presumably satisfactory for its intended use, is not believed to have the versatility (in terms of the number of different operations it can perform) for high speed handling of articles such as books, as the present invention.

SUMMARY OF THE PRESENT INVENTION

The present invention provides apparatus which is designed to handle articles such as books at extremely high speeds and which can perform functions such as (1) alternately feeding a stream of books into two streams, (2) combining two streams of books into a single stream, or (3) rejecting single books or a stream of books on command from a main stream.

In accordance with one feature of the present invention a conveyor means is moveable in timed relation to a stream of moving articles such as books or signatures. The conveyor means supports both first and second guide means for movement therewith, and each of the first and second guide means are also moveable relative to the conveyor means. Each of the first and second guide means defines means for engaging moving articles. First cam means are engageable with the first guide means to position the first guide means relative to the conveyor means to establish a first guide path for articles engaged by the first guide means. Second cam means are engageable with the second guide means to position the second guide means relative to the conveyor means to establish a second guide path for articles engaged by the second guide means. The first and second guide paths are disposed to move the first and second guide means in a single stream over at least a portion of the path of travel of the conveyor means.

Another aspect of the present invention relates to a system in which a stream of signatures are fed by a main conveyor. Alternate signatures are engaged by first and second guide means, with each guide means being separately controlled by a respective cam. Either cam can be selectively positioned (preferably on command) to guide a signature, or a stream of signatures into engagement with a divert conveyor.

Another aspect of the invention relates to a system for conveying signatures between a pair of conveyors and a main conveyor. First and second guide means are selectively positionable to guide the signatures in such modes as (1) to divert alternate signatures from a single stream into two streams, or (2) to combine signatures from two streams into a single stream.

BRIEF DESCRIPTION OF THE DRAWINGS

The further objects and advantages of this invention will become further apparent from the following detailed description taken with reference to the accompanying drawings wherein.

DETAILED DESCRIPTION OF THE PREFERRED EMBODIMENT

As set forth above, the present invention relates to an apparatus which is capable of handling articles such as books or signatures at high speed. In the description which follows the principles of the invention are described as they are incorporated in structure for use in handling books. However, from the description which follows the manner in which the principles of the present invention may be applicable to the handling of other types of comparable articles will be readily apparent to those of ordinary skill in the art.

Figure 1:
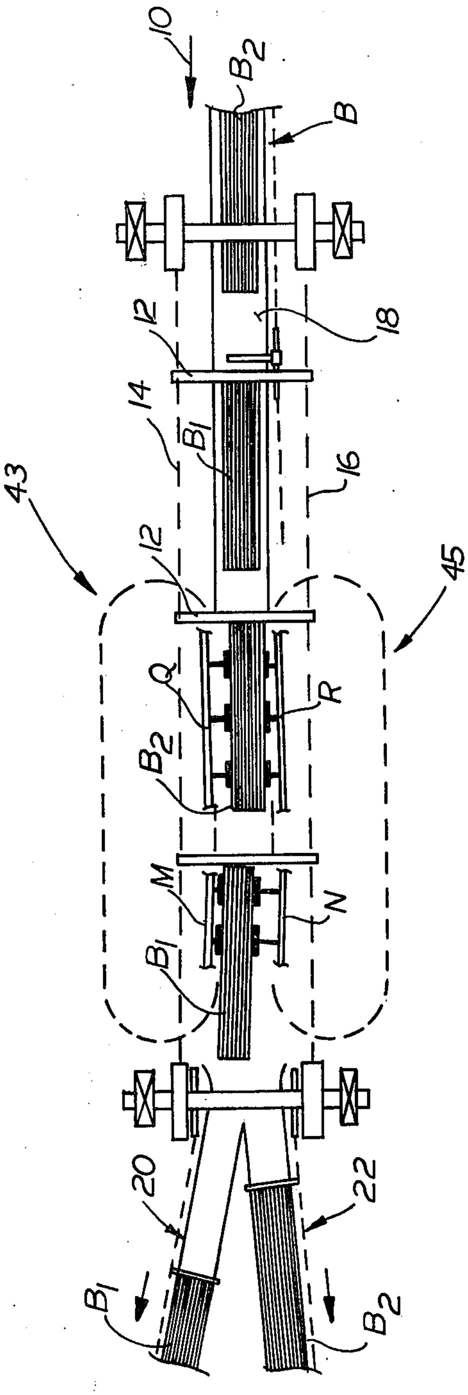
FIG. 1 is a top schematic view of a book or signature handling system incorporating the principles of the present invention.
Figure 2:
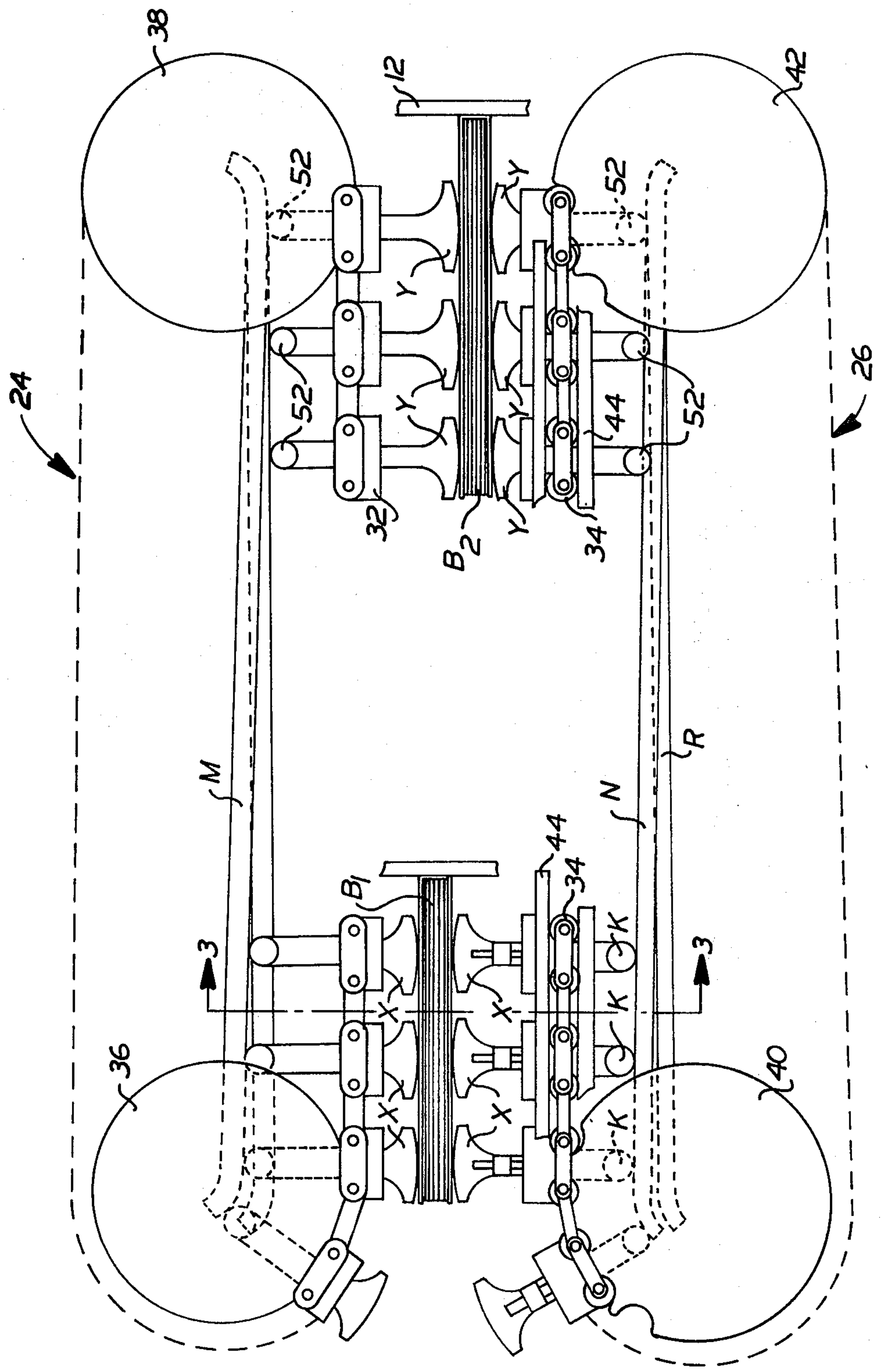
FIG. 2 is top view of an apparatus for handling books or signatures in accordance with the principles of the present invention.
Figure 3:
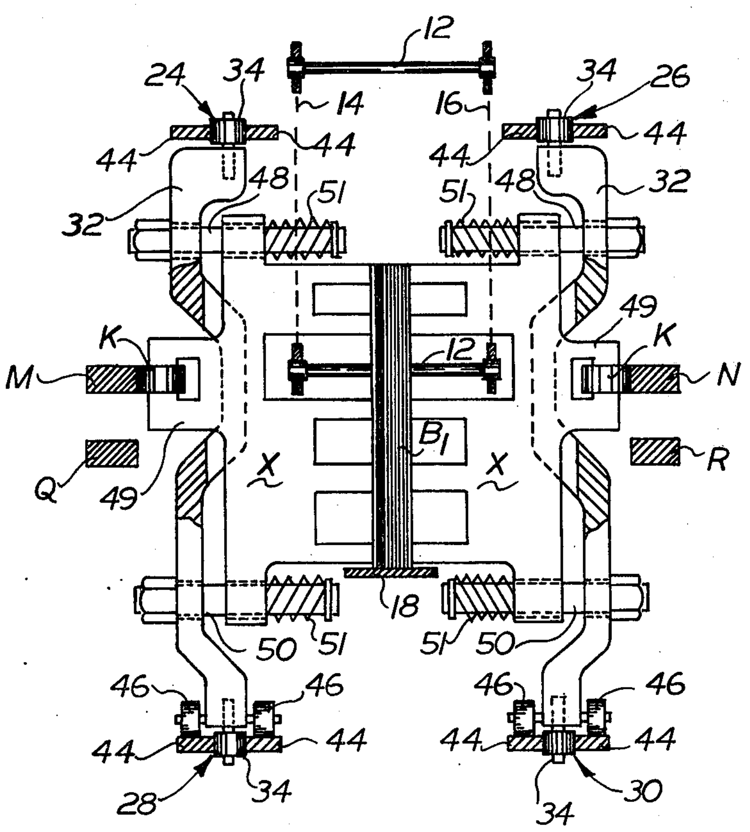
FIG. 3 is a sectional view of the book or signature handling apparatus of FIG. 2, taken from the direction 3—3.

FIGS. 1 through 3 illustrate the manner in which the principles of the present invention are applicable to feed a stream of books alternately into two streams. In book forming systems it is conventional that after groups of signatures have been collated in a gathering machine to form the books they are generally conveyed in succession in a stream with each book being oriented on its backbone. In FIG. 1, a stream of books B which have been collated in a conventional gathering machine are being conveyed in succession in the direction indicated by the arrow 10.

The books are engaged and fed in succession by a series of pushers 12 which are carried by a pair of endless conveyor chains 14, 16. Conveyor chains 14, 16 are trained about respective pulleys and, during periods of machine operation, are preferably designed for continuous movement at a predetermined speed. For purposes of this disclosure the combination of conveyor chains 14, 16 and pushers 12 form a main conveyor which conveys the books in succession in a single stream.

The books B are conveyed by the main conveyor with the backbones of the books sliding along a fixed plate 18. The books are alternately diverted into engagement with first and second conveyors 20 and 22 which are downstream of the main conveyor. Conveyors 20, 22 then serve to feed the diverted books in succession in two streams.

Referring to FIGS. 2 and 3, a conveyor means includes a pair of upper endless chains 24, 26, and lower endless chains 28, 30. Each of the endless chains is formed by a plurality of rollers 34 which are linked together. Upper chain 24 is trained about sprockets 36, 38, and upper chain 26 is trained about sprockets 40, 42. The lower chains 28 and 30 are trained about respective sprockets (not shown).

As seen in FIG. 3, a series of support members 32 are connected to the rollers forming chains 24, 28 for movement therewith to form a first endless conveyor 43 and another set of support members 32 are connected to the rollers forming chains 26, 30 for movement therewith to form a second endless conveyor 45. Pairs of fixed upper and lower track plates 44 guide the rollers 34 of each of the endless conveyors. Referring further to FIG. 3 the lower track plates 44 are engaged by rollers 46 connected to the lower ends of the support members 32 to help support the weight of the assembly. As seen in FIGS. 1 through 3 the endless conveyors 43, 45 are oriented so that books being fed by the main conveyor are fed between the conveyors 43, 45.

The conveyor means supports first guide means for movement therewith and relative thereto. As seen in FIGS. 2 and 3 the first guide means includes a set of guide plates X (3 are illustrated) for engaging opposite sides of selected first ones ($B_1$) of the books. Each guide plate X is slidably mounted on a pair of pins 48, 50 which are fixed to a respective support member 32. Each guide plate X has a portion 49 which extends through a slot in the respective support member 32 and carries a cam follower K.

By means of the foregoing construction each guide plate X is moved by the endless conveyors along an endless path, and each guide plate is movable laterally with respect to the direction of movement of the endless conveyors 43, 45 which support it.

A first cam is provided for engaging each of the guide plates X over a selected period of travel of conveyors 43, 45 for positioning the guide plates laterally with respect to the conveyor and for establishing a first guide path for the selected first books $B_1$. In FIGS. 1 through 3 the first cam is formed by a pair of linear cams M, N, associated with each endless conveyor 43, 45. The cams M, N are positioned so that the cam followers K of the guide plates X are aligned with the cams M, N. The guide plates X are biased into engagement with cams M, N by means of springs 51.

With the foregoing construction the first cams M, N engage the guide plates X and position the guide plates laterally of the endless conveyors 43, 45 as the endless conveyors move in timed relation to the movement of the main conveyor. The positioning of the guide plates X under the influence of the respective cams establishes a first guide path for books $B_1$ which are engaged by guide plates X. As seen from FIG. 3, and as schematically illustrated in FIG. 1 the cams M, N are positioned so that the first guide path directs the selected first books $B_1$ into engagement with first conveyor 20. The conveyor 20 receives the books in succession and serves to further transport them in succession for further processing.

Referring again to FIGS. 2 and 3, selected second ones of the books $B_2$ (i.e., those which follow books $B_1$) are engaged by second guide means which are also supported for movement by the conveyor means (in this case by endless conveyors 43, 45). The second guide means includes a set of second guide plates Y disposed to engage the selected second books $B_2$. Plates Y are connected to support members 32 for lateral movement relative to endless conveyors 43, 45 in a manner which is similar to the manner that plates X are connected. Plates Y have cam followers 52 which are aligned with second linear cams Q, R which are associated with endless conveyors 43, 45. The second set of cams serves to position plates Y laterally of the endless conveyors to establish a second guide path for books $B_2$. In FIGS. 1–3 the second guide path is disposed to guide books $B_2$ into engagement with second conveyor 22.

The first and second guide paths serve to position the first and second guide means in a single stream over at least a portion of the path of travel of endless conveyors 43, 45. In the illustrated schematic of FIG. 1, the first cams M, N and the second cams Q, R are set so that the first and second guide means engage alternate books $B_1$, $B_2$ being fed in a single stream along the main conveyor. The books $B_1$, $B_2$ are alternately fed into engagement with opposite ones of the conveyors 20, 22 to form two streams of books. The first guide members X engage first books $B_1$ and divert them to conveyor 20 and second guide members Y engage each succeeding one of the books $B_2$ and divert them to conveyor 22.

While the first cams M, N are illustrated in first positions in which the first guide path diverts books $B_1$ to conveyor 20 they can also be set in a second position so that the first guide path diverts books $B_1$ to conveyor 22. Similarly, cams Q, R can also be set so that the second guide path diverts books $B_2$ to conveyor 20.

It is also possible to selectively divert a book or series of books out of a mainstream of books. For example, in the arrangement of FIG. 1–3 the first cams M, N and the second cams Q, R would be normally positioned to divert all of the books to one conveyor (for example, 20). Either both of the first or second cams are then selectively positioned, on command, to cause a book (s) to be diverted to the other conveyor. The details of controls for selectively positioning one cam on command will be readily apparent to those of ordinary skill in the art and therefore should require no further explanation. It will also be appreciated by those of ordinary skill in the art that the speed of conveyors 20, 22 relative to the speed of the main conveyor will depend upon the manner in which the books are to be diverted. For example, if all books are to be normally directed to one conveyor (20 or 22) that conveyor should be running at approximately the same speed as the main conveyor. In the event books are alternately directed to the conveyors 20, 22 those conveyors are each operated at a speed which is approximately one-half the speed of the main conveyor.

In addition, while the illustrated embodiment has shown the application of the principles of this invention for diverting a single stream of books into two streams these principles are also equally applicable to serve a combining function, i.e., to combine streams of books being fed from conveyors 20, 22 into a single stream along the main conveyor. To accomplish this purpose the mechanism illustrated in FIGS. 2 and 3 is run in the reverse direction in timed relation to the movement of conveyors 20 and 22 and to the main conveyor and with its respective first and second guide paths positioned to guide the books from the respective conveyors 20, 22 into a single stream on the main conveyor.

Figure 6:
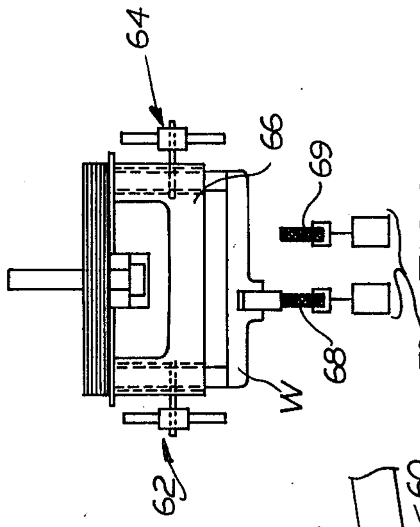
FIG. 6 is a front sectional view of an apparatus for handling the signatures of the embodiment of FIGS. 4 and 5, as viewed from the direction 6—6 in FIG. 4.
Figure 4:
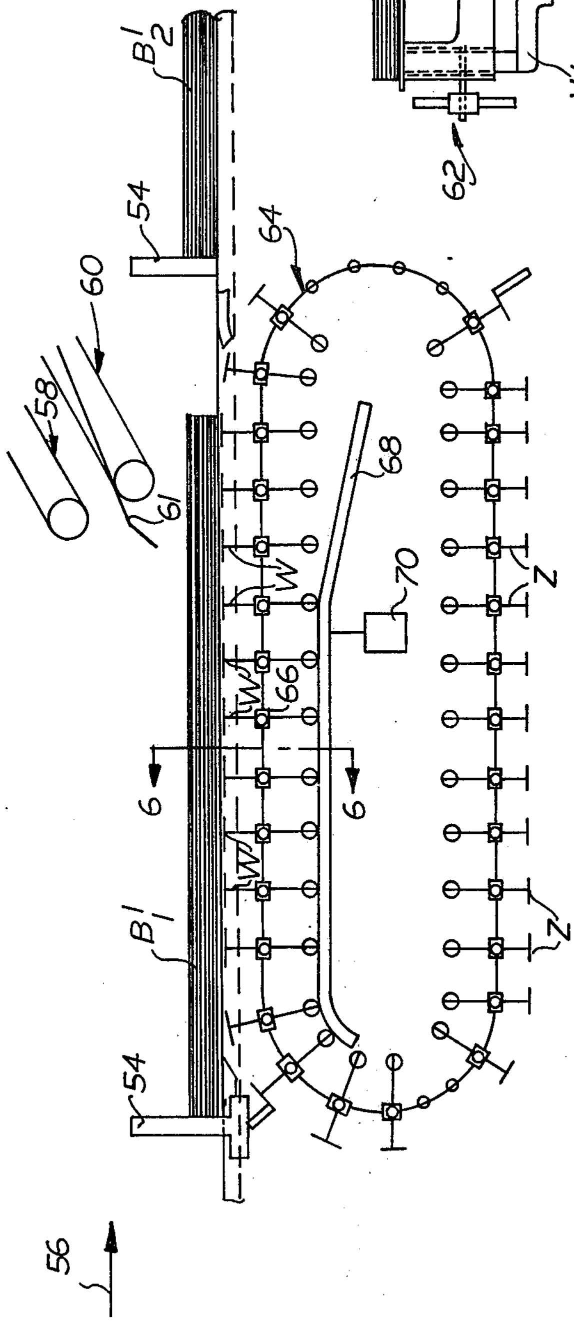
FIGS. 4 and 5 are schematic illustrations of an apparatus for performing another control function in accordance with the principles of the present invention.
Figure 5:
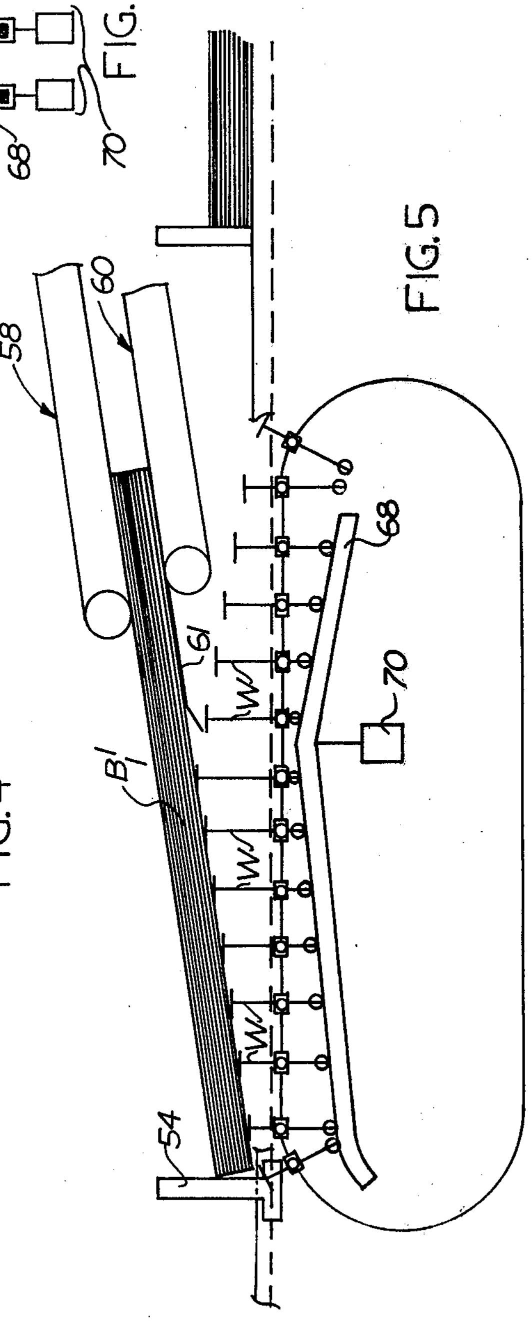

Another aspect of the present invention is illustrated in FIGS. 4 through 6. In numerous book handling operations books are conveyed in a substantially horizontal direction and on their sides in the manner illustrated in FIG. 4. Detection means, which are well known, sense incorrectly formed books and it is desirable to remove such books from the stream.

In FIGS. 4–6, a main conveyor includes pushers 54 which are continuously moved by an endless conveyor in the direction shown by the arrow 56 to convey books B in a stream. A pair of divert conveyors 58, 60, and a guide plate 61 are disposed above the main conveyor for receiving incorrectly formed books.

According to the present invention conveyor means are positioned beneath the stream of books being fed by the main conveyor. The conveyor means includes a single conveyor formed by a pair of endless chains 62, 64 trained about appropriate sprockets (not shown) and carrying a series of support members 66. A set of first guide members W forms a first guide means which engages a book $B_1'$ being moved along the horizontal path. A second set of guide members Z forms a second guide means which engages each succeeding book $B_2'$ being fed along the horizontal path. Both first and second guide members are movable laterally with respect to the conveyors 62, 64.

The first guide members W engage a first cam 68 during the horizontal run of conveyors 62, 64. Second guide members Z engage a second cam 69 during the horizontal run of the conveyors 62, 64. When an incorrect book has been sensed and it is desired to divert that book out of the main stream control means 70 operates to selectively position the cam associated with the guide members which engage the book. The cam then positions the guide members to divert the book into engagement with divert conveyors 58, 60 in the manner illustrated in FIG. 5.

As will be readily appreciated by those of ordinary skill in the art by diverting books in the foregoing manner an entire machine cycle be used for the diversion of a single book. That is, irrespective of the positioning of the guide members which engage one book the next succeeding book is engaged by guide members under control of another cam. Therefore, the control functions are effected between the entire space between the leading edges of successive books and need not be operated between the trailing edge of one book and the leading edge of the next succeeding book.

With the foregoing disclosure in mind it is believed that various obvious modifications of the principles of this invention will become readily apparent to those of ordinary skill in the art.

Therefore what is claimed is:

1. Apparatus comprising a main conveyor including means for conveying a series of signatures in single stream, a first conveyor including means for conveying a series of signatures in a single stream, a second conveyor including means for conveying a series of signatures in a single stream, conveyor means movable in timed relationship to said main conveyor and to said first and second conveyors, first guide means supported by said conveyor means for movement therewith and for movement relative thereto, said first guide means defining means for engaging moving signatures, first cam means engageable with said first guide means over a predetermined portion of the path of travel of said conveyor means for positioning said first guide means relative to said main conveyor and to said first and second conveyors to establish a first guide path for signatures engaged by said first guide means, said first cam means being positionable in a first position for establishing said first guide path between said main conveyor and said first conveyor and being positionable in a second position for establishing said first guide path between said main conveyor and said second conveyor, second guide means supported by said conveyor means for movement therewith and for movement relative thereto, said second guide means defining means for engaging moving signatures, second cam means engageable with said second guide means over a predetermined portion of the path of travel of said second conveyor means for positioning said guide means relative to said main conveyor and to said first and second conveyors to establish a second guide path for signatures engaged by said second guide means, said second cam means being positionable in a first position for establishing said second guide path between said main conveyor and said first conveyor and positionable in a second position for establishing said second guide path between said main conveyor and said second conveyor.

2. Apparatus as defined in claim 1 wherein said conveyor means comprises an endless conveyor for conveying said first and second guide means in an endless path, said first and second guide means being disposed on said endless conveyor so as to be conveyed along said endless path in alternate space relation.

3. Apparatus as defined in claim 2 wherein said first guide means are moveable laterally of said endless conveyor and said second guide means are moveable laterally of said endless conveyor, said first cam means comprising a first cam member engageable with said first guide means for positioning said first guide means laterally of said endless conveyor over a predetermined portion of the path of travel of said endless conveyor, said second cam means comprising a second cam member engageable with said second guide means for positioning said second guide means laterally of said endless conveyor over a predetermined portion of the path of travel of said endless conveyor.

* * * * *

UNITED STATES PATENT AND TRADEMARK OFFICE
CERTIFICATE OF CORRECTION

PATENT NO. : 4,170,288

DATED : October 9, 1979

INVENTOR(S) : HENRY MEBUS

It is certified that error appears in the above-identified patent and that said Letters Patent are hereby corrected as shown below:

Column 6, line 35, delete "second".

Signed and Sealed this

*Twenty-ninth* Day of *January 1980*

[SEAL]

*Attest:*

SIDNEY A. DIAMOND

*Attesting Officer* *Commissioner of Patents and Trademarks*